Feb. 19, 1946.                A. L. FOSTER                2,395,263
                         ISOMERIZATION PROCESS
                          Filed May 5, 1942

INVENTOR
ARCH L. FOSTER

Patented Feb. 19, 1946

2,395,263

UNITED STATES PATENT OFFICE 2,395,263

ISOMERIZATION PROCESS

Arch L. Foster, Bartlesville, Okla., assignor to Phillips Petroleum Company, a corporation of Delaware Application May 5, 1942, Serial No. 441,838

2 Claims. (Cl. 260—683.5)

This invention relates broadly to a process for the preparation of catalyst masses and more specifically to a process involving the deposition of volatile catalytic materials, especially volatile metal halides, on active or inert carrier or support materials to produce improved types and forms of catalysts. In another aspect it relates to apparatus for preparing such catalysts and effecting reaction therewith.

Catalysis in the petroleum and allied industries has assumed a position of relatively tremendous importance in recent years, and an increasing number of processes are now carried out in petroleum refining with the aid of catalysts. The preparation of catalysts for use in these processes as well as in other catalytic processes therefore is of primary importance, especially for the purpose of making the catalytic agents more efficient for their purposes. The conditions employed in various processes vary widely. The nature of the charge stocks also varies through very wide limits; the purposes of the different processes show the widest of variations but all demand the same attainments of economy and efficiency.

One of the primary conditions required of catalysts is efficient contact between catalyst and reacting materials. One widely accepted theory of catalytic action is that reactions are promoted by the catalyst by surface contact, and that catalytic action is greatest at edges and corners of surfaces, as in crystals or the edges, points, and corners of amorphous materials. It is therefore required that a maximum of catalyst surface be exposed to contact with reacting materials in order to effect the desired reaction in the desired direction. Efficiency thus demands that the largest practicable surface per unit of catalyst material be exposed. One object, therefore, of this invention is to prepare catalysts which expose the maximum working surface to the materials to be reacted.

Economic reasons dictate also that production, handling and regeneration of catalysts be carried out in the least expensive manner practicable under the specific conditions which obtain. Catalyst preparation and regeneration costs are invariably a comparatively large item in the total cost of operating a catalytic process, and means for reducing this cost per unit of output or per unit of efficiency is a highly desirable and advantageous development and constitutes a new and useful invention. An object of this invention is to prepare a catalyst in the most economical manner consistent with the purpose of the catalyst and its efficiency and to produce a catalyst which is readily and economically regenerated.

Regeneration of catalysts in situ is economically desirable if it can be accomplished efficiently. Removal of spent catalyst is invariably a cost item of appreciable importance and means for accomplishing this step in the most economical manner is a definite advantage to the operator and the process. Another object of this invention is to so prepare and install catalyst masses that ease of regeneration is promoted and recovery and/or removal of spent catalyst is accomplished in the most satisfactory manner.

Purification especially of volatile catalysts to accentuate the individual catalytic activity desired or to eliminate or minimize the adverse effects which impurities may have on the main activity for which the catalyst is used is also highly important and desirable. In many cases with volatile catalysts the major impurities present volatilize at temperatures differing widely from those at which the catalytic material is vaporized. Still another object of this invention therefore is to promote the purification of catalyst materials prior to their use as catalysts.

Still another object of the invention is to provide improved apparatus for carrying out the process of catalyst preparation and for carrying out the reaction to be catalyzed therewith. Yet another object is to provide an improved complete process of conducting a catalytic reaction and including a novel mode of preparing the catalyst for the reaction itself. The reaction may involve the conversion of a gaseous or liquid hydrocarbon stream. Still another object is to provide an improved operation wherein the catalyst is formed in situ. Still another object is to provide an improved apparatus for regeneration of catalyst. Numerous other objects of the invention will be apparent from the following description and claims taken in conjunction with the accompanying drawing wherein:

Figure 1:
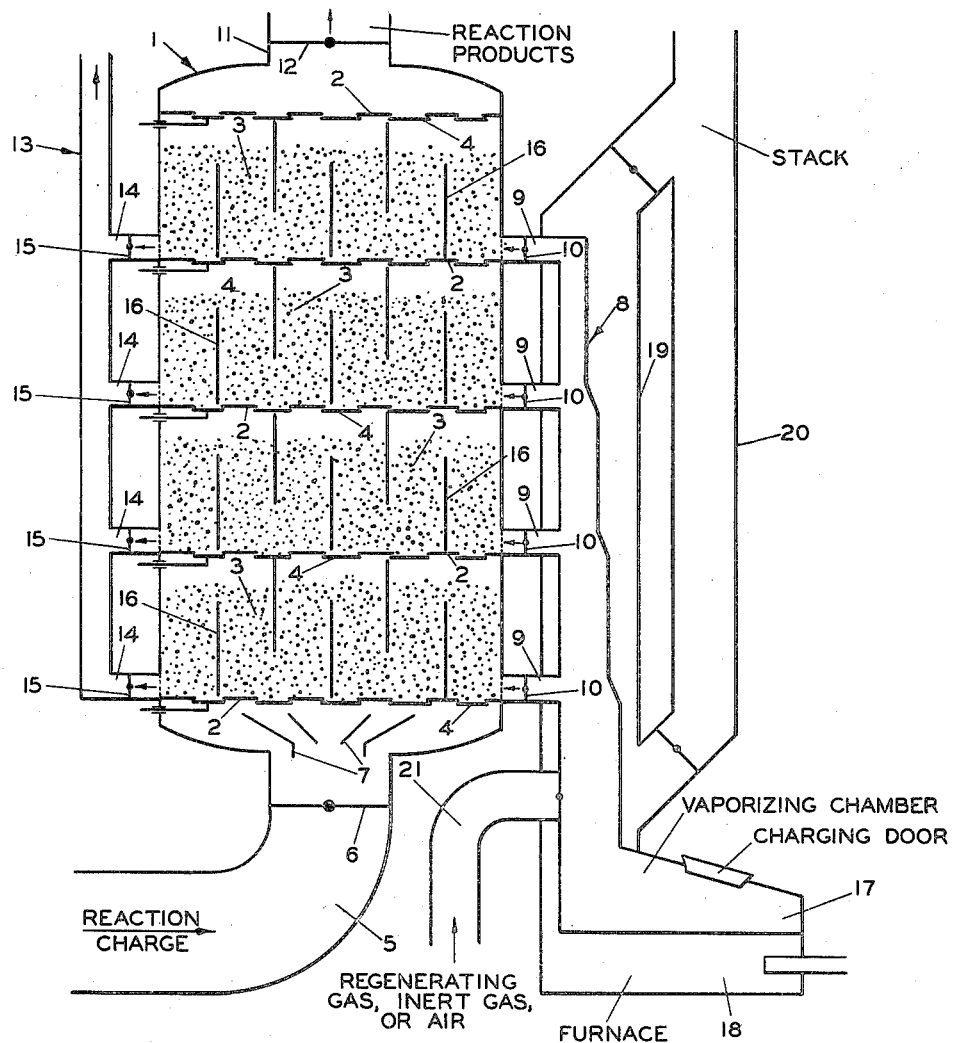
Fig. 1 is a diagrammatic vertical section of one form of equipment which has been found to be particularly suited for carrying out the process of the present invention.

A great number of procedures dealing with the preparation of catalyst masses have been heretofore described and practiced. One phase of this work is the application of relatively highly active catalytic material to or in relatively inert carrier or supporting materials. One instance of this method of preparing catalysts is the deposition and reduction of platinum and similar catalysts upon inert carriers such as magnesium sulfate and similar supporting materials; another is the impregnation of silica or alumina gel with metal salts, sulfides, oxides, etc., to prepare an active, efficient catalyst product. This application is accomplished by various means, such as impregnation of the supporting material, usually a porous body in more or less finely comminuted state, with a solution of the catalytic material, precipitating both carrier and catalyst together from a solution and conditioning the mixed precipitate, or intimately mixing the carrier and the catalyst materials and forming into pellets or using the mixture in loose form. The purposes of a carrier are mainly two: to support in a definite maintainable form a catalyst which cannot be fashioned by itself into a sufficiently rigid form; and to present a given quantity of catalyst in a form which exposes a greater surface area than can be done if the catalyst itself is its own support. The support material may itself have some catalytic effect in the reaction for which it is employed or it may be entirely inert and without appreciable catalytic effect. It should have no deleterious or inhibiting effect on the reaction promoted by the primary catalyst employed and must, of course, have no poisonous effect on the catalyst.

Most of the metal halides employed as catalysts for reactions between hydrocarbons and organic compounds are volatile at relatively low temperatures. Below are given the melting and boiling points of the more common metal halides employed for catalytic purposes.

| | Melting point (°F.) | Boiling point (°F.) |
| --- | --- | --- |
| Aluminum chloride, AlCl$_3$ | 374 (2.5 atmospheres) | 361. 352 (sublimes). |
| Aluminum bromide, AlBr$_3$ | 207.5 | 505. |
| Ferric chloride, FeCl$_3$ | 540 | 599. |
| Aluminum iodide, AlI$_3$ | 376 | 680. |
| Zirconium chloride, ZrCl$_4$ | 572 (sublimes) | 572. |
| Zinc chloride, ZnCl$_2$ | 504 | 1,350. |
| Stannic chloride, SnCl$_4$ | −27 | 237. |
| Titanium chloride, TiCl$_4$ | −22 | 277. |

My invention is based on the principle of deposition of these normally solid or liquid but volatile metal halides, and other volatile catalysts which may be sublimed or condensed on the surface of solid inert carrier or supporting materials, in such shapes and sizes of pieces as may be best suited to the specific purpose of the catalyst. In view of the foregoing statements regarding the importance of surface area to catalyst efficiency, the shapes of the support pieces will determine in general the shape of the catalyst surface deposited thereon and therefore the ratio of catalyst surface to catalyst volume in any given quantity of the prepared catalyst. The shape of the support units therefore is chosen so as to expose the greatest practicable area of catalyst surface to contact with reacting materials present in any process in which the catalyst is used.

In accordance with my invention, a solid or liquid metal halide in anhydrous form, preferably aluminum or zirconium chloride, is sublimed onto a carrier which may be inert or catalytically active, by heating the halide in a vaporizing zone to volatilize it at the desired rate and passing the vapors through a transfer line which may be insulated, or short, or both, and which may desirably be maintained at a temperature above the volatilization temperature into a subliming chamber in which pieces or a bonded pervious bed of the carrier is contained. The temperature gradient in the path of the halide vapors is so maintained that sublimation will be substantially equal throughout the mass of carrier and that condensed halide does not pile up on the carrier.

It is preferred to carry out the catalyst preparation in situ, in the zone in which the catalytic reaction is to be conducted but under some circumstances the catalyst may be prepared in one zone and transferred, preferably while maintained in an inert atmosphere, into the reaction zone.

The temperature gradient may be maintained in the preparation zone by passing cooling or heating fluid through tubes parallel or at right angles to the path of subliming vapors, countercurrently or otherwise. This promotes even better uniformity of contact, more efficient use of catalyst, and more uniform pressure drop.

The assembly shown in Fig. 1 comprises a vertical catalyst chamber or shell 1 usually circular and divided into a plurality of connecting catalyst compartments by plate-like foraminous supports 2 on each of which there rests a pervious bed 3 of the solid catalyst carrier, with or without deposited catalyst thereon. If desired or necessary the openings in supports 2 may be provided with suitable material such as screening (not shown) to prevent catalyst carrier particles or granules from falling downwardly therebetween. The necessity for this will depend largely on the size of the carrier particles, and will be eliminated if the carrier is in the form of a bonded or cemented mass. Also, foraminous material (not shown) may be provided over the top of each bed 3 to prevent displacement thereof.

Mounted below each supporting plate 2 is a transversely slidable plate 4 which has openings such as slots or holes corresponding to those in plate 2 so that when in the open position the openings in movable plate 4 coincide with those in fixed plate 2. Thus the several compartments may be isolated substantially gas-tight from one another. The openings should be large enough to avoid stoppage by subliming catalyst or by side-reaction products formed during the reaction and the total area of the openings should be such that substantially no pressure drop takes place through the shutters when they are open as compared to the pressure drop incident to longitudinal flow through the catalyst beds. Plates 4 may be moved, preferably all simultaneously, by any suitable means (not shown).

The reaction charge in gaseous or liquid form may be admitted by duct 5 provided with a damper or valve 6. Directing baffles 7 may be placed in the bottom of the converter 1 for promoting uniform flow through all parts of the first catalyst bed contacted. Outlet duct 11 equipped with damper 12 takes off the reaction stream from the last compartment. Desirably, dampers 6 and 12 are synchronized in operation with plates 4.

For passing sublimed catalyst into the beds 3 of carrier for deposition thereupon or for effecting regeneration of a formed catalyst, a vertical manifold 8 may be provided. Short branch lines 9 equipped with dampers 10 extend from manifold 9 to the several compartments of the converter 1. Vapors of catalyst thus pass transversely through the individual beds 3 in parallel and are deposited onto, and into the pores of, the carrier. Any excess catalyst vapors or inert gas admixed therewith is removed via outlet manifold 13 having branch lines 14 equipped with dampers 15. During regeneration the regenerating gases enter via manifold 8 and exit via manifold 13.

In order to provide for uniform distribution through the catalyst beds of the transversely introduced regenerating gases or catalyst vapors, staggered baffles 16 are provided. These may be mounted vertically in the chamber 1 in any suitable manner. For example they may extend laterally across the converter shell and be fastened to the walls of the converter 1 as by welding or in any other suitable manner. Baffles 16 may extend from a point, so close to plate 2 or 4 that substantially no gas flow therebetween occurs, to a point short of the other plate 2 or 4 by a distance substantially equal to the transverse spacing between the baffles 16. Baffles 16 may be transversely so spaced as to give substantially constant cross-sectional area of the bed traversed by the gases introduced from manifold 8.

It will be obvious that since baffles 16 extend longitudinally they do not interfere with the longitudinal flow of reactants serially through the converter when on-stream.

The spacing and arrangement of baffles 16 are illustrative only and may be varied widely from that shown, depending upon the depth of the beds 3, the diameter of converter 1, the velocity desired during preparation of the catalyst, and other factors. Occasionally only a single baffle will be used. If desired the baffles which extend upwardly from fixed plates 2 may be welded thereto to absolutely prevent gas flow therebetween.

Vaporized catalyst may be supplied to inlet manifold 8 by means of vaporizing chamber 17 heated by furnace 18. The hot combustion gases preferably pass upwardly through a jacket 19 surrounding manifold 8 so as to keep the catalyst in the vaporized form. Under certain circumstances, as where regeneration of the catalyst is being carried out, the stack gases from furnace 18 may be by-passed partially or completely through duct 20 to the stack to control the temperature maintained in manifold 8, or outside air may be admixed via duct 21 to cool the flue gases.

Regenerating or inert gases may be introduced to manifold 8 by means of conduit 21 and there pass through the catalyst beds in parallel as before and out manifold 13. If desired the regeneration may involve driving off by volatilization the condensed catalyst in the carrier beds 3, and burning off any hydrocarbon or carbonaceous deposit in the beds, followed by renewal of the catalyst component, usually a volatile metal halide, by vaporization of new catalyst in chamber 17. The effluent regeneration gases may be treated if desired to recover in pure form for re-use the vaporized catalyst component contained therein.

Figure 2:
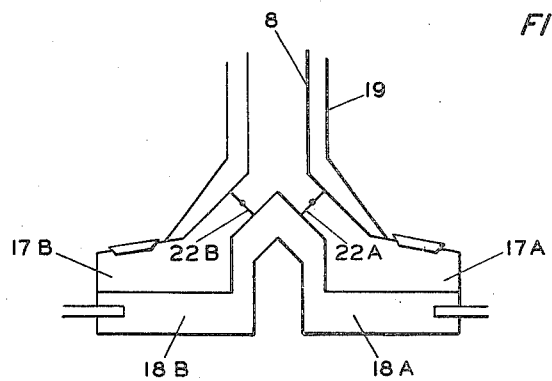
Fig. 2 is a diagrammatic section of a portion of a modified form of equipment.

Fig. 2 shows a modification wherein there are provided a plurality, in this case two, of vaporizing chambers 17A and 17B heated by furnaces 18A and 18B, for separately vaporizing two different catalytic materials so that the proportions thereof deposited in the carrier may be regulated within any desired limits regardless of differences in vapor pressure of the several materials. Proportioning of the several catalytic materials may be effected by individually regulating the extent of vaporization in the several vaporizing chambers, as by control of temperature and amount of heat supplied, so that the rate of vaporization is controlled. Less preferably, control of proportions may be regulated to some extent by adjustment of the dampers 22A and 22B in the ducts leading from the vaporizing chambers 17A and 17B to the manifold 8.

Alternatively, separate manifolds for the several catalyst materials in vapor form may be provided.

By proceeding in the foregoing manner the proper proportions of the several volatile catalytic materials deposited in the bed of carrier support may be nicely regulated.

As will be obvious, control of dampers or valves 10 and 15 will be synchronized with movement of damper plates 4 so that, when damper plates 4 are in the closed position, dampers 10 and 15 are open and vice versa.

It will be obvious that damper plates 4 are operable by any suitable means (not shown) from the outside of the chamber 1.

The method of operation when using the apparatus of Fig. 1 is simple, and may be understood by the following description. Catalyst is placed in the oven 17, which may have any convenient design, and is heated by means of furnace 18 provided with gas or oil burners, waste heat or other heat source, thereby volatilizing the catalyst at the desired rate. The vapors are conducted through an insulated, heated vapor line or breeching 8 to auxiliary lines 9 connecting with the different compartments 3 of the catalyst chamber 1. This vapor line is heated by a gas jacket 19 through which pass combustion or heating gases from the furnace 18 at a temperature slightly above the subliming temperature of the catalyst but low enough that little reduction of this temperature is necessary to start sublimation of the catalyst in the chamber. The chamber compartments 3 are packed in any desired manner with the pellets, block or other carrier units, preferably leaving a vacant space between the top of each catalyst bed and the shutter 4 and the support 2 for the next compartment above. Each compartment 3 is cut off from the others by the shutter system shown or in any other suitable way, such as one or more large ducts connecting the compartments, which ducts may be closed by valves of any efficient type.

The temperature gradient within the chamber compartments 3 is so maintained that the subliming catalyst is not deposited too heavily in any one part of the compartment but is distributed substantially evenly throughout the carrier body. This may be effected by heating and/or cooling means installed in each compartment, of any efficient design such as horizontal or vertical pipes through which heating or cooling fluids may be circulated, the bank of tubes being so subdivided that the required flexibility of heating different segments of the chamber is obtained. Normally it may be necessary to heat the portion of the compartment farthest from the point where catalyst vapor enters the compartment, and in some cases it may be necessary to cool the portion nearest the catalyst entrance duct to remove heat of sublimation therefrom and to maintain a satisfactory temperature for sublimation.

Intimate contact of the catalyst vapors with all parts of the carrier bed is facilitated by the use of a baffle system, which, for example, may be a single baffle, but preferably comprises a series of baffles as illustrated. Any other satisfactory system may be employed to meet the requirements of any given individual unit.

An inert gas, such as nitrogen, flue gas or other inert gas, may be introduced into the manifold 8 through the inlet 21, to aid in maintaining the temperature of the vapors and in sweeping the vapors into the chamber compartments. The individual compartment lines 9 are shuttered or valved in any manner which will maintain an equalized flow of catalyst vapor into the several compartments.

Flow of catalyst vapor is maintained until the average depth of the sublimed layer on the carrier pieces or mass is that desired, whereupon transfer of catalyst vapor is stopped and valves 10 and 15 in the catalyst deposition system are closed. The catalyst bed is then ready for use in the process for which the unit is designed. When the catalyst is spent, its regeneration may be carried out in any desirable or suitable manner which is practicable for the individual catalyst.

The temperatures required in the vapor stream for satisfactory sublimation varies widely, depending on the catalyst employed. The boiling point of anhydrous aluminum chloride, for example, is about 361° F.; its subliming temperature is about 352° F. The temperature in the oven must be high enough, therefore, to vaporize the aluminum chloride at a satisfactory rate. The temperature of the vapor lines and ducts must be maintained high enough that the vapor reaches the entrance of the catalyst chamber at a temperature a few degrees above the subliming point. The heat of sublimation is removed from the chamber by a suitable means in order to maintain the desired rate of deposition. By manifolding the cooling system or by other means sublimation in a later period of the deposition run may be reduced to a minimum in, for example, the nearer portion of the chamber compartment when deposition there has reached the desired point while it is continued or even accelerated in the farther portions of the compartment by maintaining a lower temperature in that portion. Zirconium chloride sublimes at about 572° F. and the temperature for its volatilization is maintained at a level higher than this value, sufficient to maintain a desired volatilization rate. A temperature differential above the vaporizing point of about 5° F. to 25° F. is usually satisfactory, although lower or higher differentials may be employed when conditions make such desirable.

One of the advantages obtained in volatilization of metal halides and other volatile catalysts of this class is that impurities present in the commercial product may be eliminated or reduced in quantity in the sublimed material, increasing the efficiency of the catalyst thereby. For example, ferric chloride volatilizes at about 505° F., and is present as an impurity up to 1.5 per cent or more in most commercial anhydrous aluminum chloride. Assuming a 375° F. temperature for volatilizing $AlCl_3$ from the oven, some of the $FeCl_3$ will be vaporized along with the other material, but the major portion of it will remain in a molten or solid state in the over as a residue. Ferric chloride in the presence of metallic iron is reduced to ferrous chloride, $FeCl_2$, which vaporizes at a much higher temperature, about 1240° F. Therefore the ferric chloride in contact with the iron or steel of the oven will tend to form the ferrous salt which will remain unvaporized, removing the iron impurity from the $AlCl_3$ in great measure. Also, finely divided iron may be mixed with the crude aluminum chloride before vaporization, which will form the ferrous salt and retain the iron in the oven during volatilization. Also, finely divided aluminum metal may be added, forming aluminum chloride and reducing the ferric chloride to ferrous chloride or to the metal. Or, other metals or substances may be employed which will reduce the iron salt to one of lower iron valence or to the metallic state but will not affect the $AlCl_3$ during the vaporization step. Correspondingly, impurities of higher volatility than that of the halide being deposited will be vaporized and will be passed through the catalyst chamber in the vapor state, provided the temperature therein is above the subliming or condensation temperature of the more volatile impurity.

When it is desired to employ catalysts of this metal halide class, such as stannic or titanium chlorides, which are liquid at atmospheric temperatures, the support material may be impregnated by flowing the liquid over the carrier and drawing off the excess which is not retained by the porous material. However, it is highly preferred to vaporize the liquid and condense it on the support in the same manner as that employed with solid catalysts. The use of liquid catalysts in this manner is more efficient than in any other way, provided the temperature of reaction is below the vaporizing temperature of the catalyst. Liquid catalysts will be removed gradually by vaporization even when employed at temperatures somewhat below their boiling points, and are separated from the reaction products by any suitable means and returned to the reaction chamber in any satisfactory manner.

As stated above, the supporting materials may be of any material which possesses the required rigidity of form and which may be prepared in the required forms and shapes and is sufficiently rugged to withstand the abrasive and destructive effects of repeated handling and continued use in the process. Some of the materials are alumina and silica, kieselguhr, metal silicates, sulfates, fuller's earth and diatomaceous earths, minerals and ores, pumice, bauxite, and commercial and proprietary products possessing the desired physical and chemical properties. The carrier may be prepared in any satisfactory form which will insure the required porosity in the bed, efficient passage of charge stocks in contact with the maximum surface area of the catalyst and comparative ease in regeneration of the catalyst or its removal from the chamber when spent. Supporting carrier materials must be used in forms which exhibit a minimum degree of close packing. Planar surfaces are used only if so arranged that interstices are many and frequent and that continuous edge contact, which does not permit passage of liquid or vapor in contact with the catalyst surface, is avoided.

Supporting carriers are preferably prepared with a rough, pebbly or otherwise unglazed or unpolished type of surface. Generally the porous type of catalyst carrier gives the best results and a porous type of material, combined into a pellet form with a pebbly, rough surface exhibits the greatest tenacity for holding the sublimed catalyst, retains the catalyst in active form for the longest time and shows the most efficient results when the catalyst is regenerated in situ. Catalyst carriers may in many cases be best prepared according to the method outlined in my co-pending application Serial No. 440,561, filed April 25, 1942, which describes a method for preparing an improved type of granular catalyst by subjecting particulate catalytic materials to pressure while heating them to temperatures sufficient to cause welding at the points of contact only. Any of the physical forms mentioned in that application are applicable to the manufacture of deposited catalyst carriers, as are any other forms which meet the principle of these requirements.

The following example is illustrative of one manner of applying the principle of this invention, without in any way limiting that principle or its application to the problem of preparation of deposited catalysts.

*Example*

Four hundred (400) pounds of commercial aluminum chloride is heated above its vaporization temperature (at 374° F.) in a closed, insulated oven direct-connected by jacketed ducts to each of three compartments in a catalyst reaction chamber. The ducts are heated by combustion gases from the oven furnace cooled by introduction of outside air to maintain the temperature of the ducts 2-5° F. above the subliming temperature. The vaporized catalyst is deposited on pelleted granular bauxite until an average depth of about $\frac{1}{8}$-inch of catalyst is formed on the carrier. Horizontal pipe coils carrying cooling water maintain an average temperature of 325-350° F. in each compartment of the catalyst chamber, the temperature being a few degrees higher on the inlet side of the compartment than on the side opposite the inlet, to promote a more even deposit of catalyst. After the required amount of catalyst has been deposited the catalyst inlets are closed and the chamber and its contents are allowed to cool to approximately the temperature at which the catalytic process is to be operated. Hydrocarbon vapors are admitted and the unit is operated on an isomerization process.

Two or more catalyst materials may be deposited at the same time on the same carrier in intimate mixture by vaporizing the materials at the same time and introducing the vapors into the catalyst chamber simultaneously. This may be carried out by mixing the solid or liquid materials in crystalline or amorphous or liquid form and heating in a vaporizing still or oven at a temperature suitable for vaporizing the two or more components at satisfactory rates. However, it may be accomplished with greater efficiency and flexibility by heating each catalytic material in a separate vaporizing unit and introducing and mingling the vapors in the deposition zone simultaneously and continuously until the desired quantities of each have been deposited. By this latter method any combination of percentages of the different components may be disposed in the composite catalyst in the most intimately mixed condition, merely by maintaining the temperature of the deposition zone at a value satisfactory for depositing the most volatile of the materials, and by regulating the rates of vaporization to volatilize the materials in the desired ratio.

The catalyst bed prepared in accordance with my invention may be used to promote any desired chemical reaction. Usually it is used for carrying out those reactions which are catalyzed by anhydrous aluminum chloride and its equivalents. See C. A. Thomas, "Anhydrous Aluminum Chloride in Organic Chemistry," 1941. However, it is preferred to use it for hydrocarbon conversions, such as polymerization, isomerization, alkylation, etc.

I claim:

1. In a process for the catalytic conversion of a hydrocarbon by contact with a volatile metal halide conversion catalyst deposited on porous granular supporting material, the steps which comprise arranging the granular supporting material in the form of a plurality of separate stationary beds, vaporizing the metal halide catalyst, flowing a separate stream of said catalyst vapor through each bed individually in a direction substantially parallel thereto, in such manner that the vapor intimately contacts the supporting material in each of the said beds to uniformly deposit said catalyst material thereon, continuing flow of said metal halide vapor until a catalytic amount of said metal halide has been deposited on said granular supporting material, and then flowing a stream of hydrocarbon vapor over said supporting catalyst material in a direction substantially perpendicular to said beds and under conversion conditions whereby conversion of said hydrocarbon is effected.

2. A process according to claim 1 wherein the catalytic conversion is hydrocarbon isomerization and wherein the volatile metal halide catalyst is aluminum chloride.

ARCH L. FOSTER.